United States Patent
Chin et al.

(10) Patent No.: US 9,028,578 B2
(45) Date of Patent: May 12, 2015

(54) GAS TURBINE INLET FILTER WITH REPLACEABLE MEDIA CARTRIDGES

(71) Applicant: BHA Altair, LLC, Franklin, TN (US)

(72) Inventors: Jien Chin, Cypress, TX (US); Cynthia Marie Polizzi, Delmar, NY (US); William Keith Albert Eyers, Chobham Surrey (GB); Stephen Bartlett, Romsey Hants (GB)

(73) Assignee: BHA Altair, LLC, Franklin, TN (US)

( * ) Notice: Subject to any disclaimer, the term of this patent is extended or adjusted under 35 U.S.C. 154(b) by 97 days.

(21) Appl. No.: 13/779,941

(22) Filed: Feb. 28, 2013

(65) Prior Publication Data

US 2014/0237966 A1 Aug. 28, 2014

(51) Int. Cl.
*B01D 46/00* (2006.01)
*B01D 46/52* (2006.01)
*B01D 46/12* (2006.01)

(52) U.S. Cl.
CPC ....... *B01D 46/0005* (2013.01); *Y10T 29/49826* (2015.01); *B01D 46/521* (2013.01); *B01D 46/002* (2013.01); *B01D 2271/02* (2013.01); *B01D 46/0002* (2013.01); *B01D 46/125* (2013.01)

(58) Field of Classification Search
CPC ............. B01D 46/0005; B01D 46/002; B01D 46/125; B01D 2271/02; B01D 46/521
USPC ..................... 55/483, 484, DIG. 31
See application file for complete search history.

(56) References Cited

U.S. PATENT DOCUMENTS

| | | | |
|---|---|---|---|
| 3,938,970 A | 2/1976 | Carter, Sr. | |
| 4,193,780 A | 3/1980 | Cotton, Jr. et al. | |
| 4,519,823 A | 5/1985 | Kinney, Jr. et al. | |
| 5,223,011 A * | 6/1993 | Hanni | 55/484 |
| 5,512,074 A * | 4/1996 | Hanni et al. | 55/484 |
| 5,730,769 A | 3/1998 | Dungs et al. | |
| 6,139,595 A | 10/2000 | Herman et al. | |
| 6,485,538 B1 * | 11/2002 | Toyoshima | 55/490 |
| 6,602,308 B1 | 8/2003 | Carle et al. | |
| 6,959,819 B2 | 11/2005 | Moswcaritolo | |
| 7,413,588 B2 | 8/2008 | Holzmann et al. | |
| 7,695,551 B2 | 4/2010 | Janawitz et al. | |
| 7,753,981 B2 | 7/2010 | Kawano et al. | |
| 7,828,870 B1 | 11/2010 | Rech et al. | |
| 8,029,723 B2 | 10/2011 | Angadjivand et al. | |
| 8,328,895 B2 * | 12/2012 | Nicholas | 55/483 |
| 2002/0166312 A1 | 11/2002 | Phelps | |
| 2008/0173276 A1 | 7/2008 | Barnard et al. | |

(Continued)

*Primary Examiner* — Robert Clemente
(74) *Attorney, Agent, or Firm* — Reinhart Boerner Van Deuren P.C.

(57) ABSTRACT

A filter arrangement for a system within which fluid is filtered and an associated method of providing the arrangement. A frame of the arrangement includes an outer periphery shape that is complementary to a shape for location of the filter arrangement therein and a plurality of filter cartridge seat slots arranged in V-shaped pairs. Each filter cartridge seat slot provides a sub-aperture for removably receiving a respective filter cartridge in a direction transverse to the flow proceeding through the sub-aperture. The filter arrangement includes a plurality of filter cartridges that are removably located within respective filter cartridge seat slots. The filter arrangement includes a non-permanent sealing arrangement between the filter cartridges and the frame so that flow does not by-pass filter media. The non-permanent arrangement permits removal of the filter cartridges from the frame and replacement with new filter cartridges upon the frame.

13 Claims, 6 Drawing Sheets

(56) References Cited

U.S. PATENT DOCUMENTS

| | | |
|---|---|---|
| 2010/0307118 A1 | 12/2010 | Kawano et al. |
| 2011/0154991 A1 | 6/2011 | Steele et al. |
| 2011/0252759 A1 | 10/2011 | Nicholas |
| 2012/0020773 A1 | 1/2012 | Herrmann |
| 2013/0167493 A1* | 7/2013 | Gorman .......................... 55/484 |
| 2014/0034565 A1* | 2/2014 | Loken et al. .................. 210/232 |
| 2014/0096493 A1* | 4/2014 | Kelmartin et al. .............. 55/482 |
| 2014/0137524 A1* | 5/2014 | Jarrier ............................. 55/482 |

* cited by examiner

GAS TURBINE INLET FILTER WITH REPLACEABLE MEDIA CARTRIDGES

BACKGROUND OF THE INVENTION

1. Field of the Invention

The present invention relates to filter arrangements that have multiple filter media cartridges.

2. Discussion of Prior Art

Filtration of fluid, such as air, is typical for various applications such as gas turbine inlet systems. Various types of filter arrangements can be provided to accomplish the filtration. One type of filter arrangement is known as a V-Cell filter arrangement. The V-Cell filter arrangement consists of a plurality of filter panels fixed (e.g., glued, epoxied, or similar) within a frame. Each of the filter panels has filter media that may have various constructions and configurations. One example is a mini-pleat, which has pleated filter media that extends in a saw-tooth fashion along an overall panel dimension. The filter panels are arranged in pairs so that each pair provides a general V-shape. There any number of panel pairs. All of the panel pairs are fixed within the frame to retain the V-shape. The open or wide end of each V-shape is typically located at an upstream side of the arrangement. At the open end, the two filter panels of the respective V-shape are spaced from each other to allow fluid flow into the space of the V-shape and thus allow fluid to move to the filter panels for filtration by the filter panels. A narrow or tail of the V-Shape is typically located at a downstream side of the arrangement. At the downstream side, the filter panels are in close proximity to each other and the frame is closed so that fluid flow can only proceed through the filter panels. The frame extends above and below the area of the V-shape so that flow does not proceed out at the portions above and below the filter panels so that flow can only proceed through the filter panels.

As mentioned there may be any number of pairs of filter panels. If there are plural filter panel pairs, each pair is associated with just a portion of the overall face size of the V-Cell filter arrangement. As such, the V-cell filter arrangement provides a greater amount of filter media surface area as compared to a single panel filter that has a face size equal to the face size of the filter arrangement. The greater amount of media surface allows for lower pressure drops (e.g., lower flow resistance), longer service life and/or high efficiency.

As mentioned, within the V-Cell filter arrangement the filter panels are fixed within the frame. Thus, although a V-Cell filter arrangement has many benefits, when replacement of the V-Cell filter arrangement becomes necessary (e.g., after desired filter life is reached), the V-Cell filter arrangement is a substantial object to discard. As such there is a need to further improvement concerning V-Cell filter arrangement technology.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a filter arrangement for a system within which fluid is filtered. The system has a portion with an aperture into which the filter arrangement is located for filtering fluid from a dirty side and to a clean side as the fluid flows through the filter arrangement. The filter arrangement includes a frame. The frame includes an outer periphery that has a shape that is complementary to a shape of the aperture for location of the filter arrangement therein and a plurality of filter cartridge seat slots arranged in V-shaped pairs. Each filter cartridge seat slot provides a sub-aperture through the frame for flow, proceeding from the dirty side to the clean side, for removably receiving a respective filter cartridge in a direction transverse to the flow proceeding through the sub-aperture. The filter arrangement includes a plurality of filter cartridges. Each filter cartridge is removably located within a respective filter cartridge seat slot of the frame. Each filter cartridge includes filter media that allows flow therethrough from the clean side to the dirty side while stopping flow of particulate matter. The filter arrangement includes a non-permanent sealing arrangement between the filter cartridges and the frame so that flow does not by-pass the filter media. The non-permanent arrangement permits removal of the filter cartridges from the frame and replacement with new filter cartridges upon the frame.

In accordance with another aspect, the present invention provides a method of providing a filter arrangement for a system within which fluid is filtered. The system has a portion with an aperture into which the filter arrangement is located for filtering fluid from a dirty side and to a clean side as the fluid flows through the filter arrangement. The method includes providing a frame that has an outer periphery that has a shape that is complementary to a shape of the aperture for location of the filter arrangement therein, and a plurality of filter cartridge seat slots arranged in V-shaped pairs, each filter cartridge seat slot providing a sub-aperture through the frame for flow proceeding from the dirty side to the clean side, each filter cartridge seat slot for removably receiving a respective filter cartridge in a direction transverse to the flow proceeding through the sub-aperture. The method includes providing a plurality of filter cartridges, each filter cartridge being removably located within a respective filter cartridge seat slot of the frame, each filter cartridge including filter media that allows flow therethrough from the clean side to the dirty side while stopping flow of particulate matter. The method includes providing a non-permanent sealing arrangement between the filter cartridges and the frame so that flow does not by-pass the filter media, the non-permanent arrangement permitting removal of the filter cartridges from the frame and replacement with new filter cartridges upon the frame.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
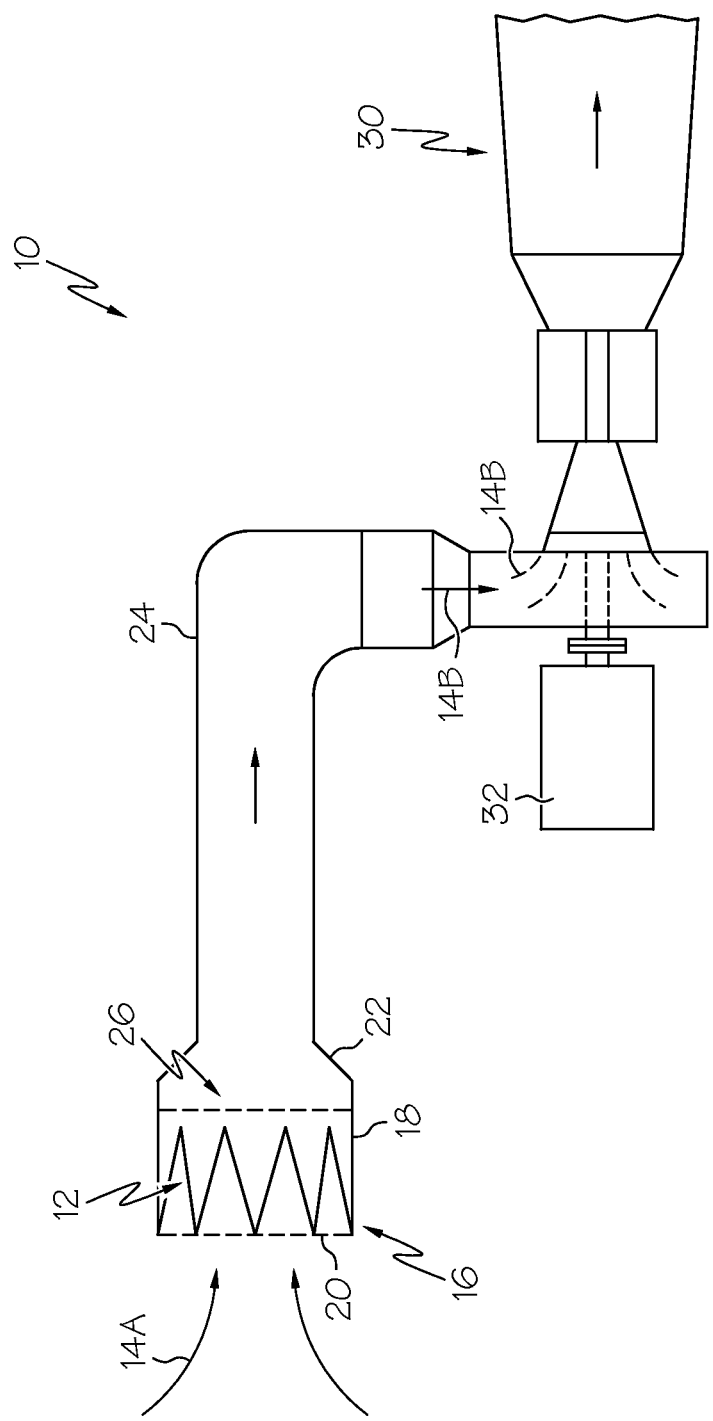
FIG. 1 is a schematic illustration of an example system that includes an example filter arrangement in accordance with an aspect of the present invention.

Example embodiments that incorporate one or more aspects of the present invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 is a schematic illustration of an example system 10 that utilizes filtered fluid (e.g., air) and in which a filter arrangement 12 in accordance with an aspect of the present invention can be utilized. It is to be appreciated that the example system 10 shown within FIG. 1 is just one example. Use of the filter arrangement 12 in accordance with an aspect of the present invention within other systems is contemplated. For example, although the example system utilizes filtered fluid, it is also contemplated that fluid can be filtered for discharge (e.g., to ambient atmosphere), storage, etc. As such, the example system 10 presented within FIG. 1 is not to be construed as a limitation upon the present invention.

Turning to the shown example system 10, the example is a turbine system 10 that utilizes air (see 14A, 14B in FIG. 1) and thus air is the example fluid being filtered fluid. It is to be appreciated that although air is the presented example fluid being filtered, other fluids (e.g., gases, such as combustion gases) are contemplated as fluid that can be filtered using the filter arrangement 12 in accordance with an aspect of the present invention. Hereinafter, although the fluid may be referred to as air, such is not to be construed as a limitation upon the present invention.

The system 10 includes an air intake 16 that has a filter house portion 18. The filter house portion includes an intake 20, which is exposed to ambient atmosphere air 14A, and an outlet 22, which is connected to a fluid passageway 24, which leads downstream toward at least one air consuming component of the system 10. Thus, the filter house portion 18 defines an aperture 26 through which air flows. The filter arrangement 12, in accordance with an aspect of the present invention, is located within the filter house portion 18. Specifically, the filter arrangement 12 is located within the aperture 26. As can be appreciated, since the filter arrangement 12 filters the flow of fluid (e.g., air), the filter arrangement within the aperture 26 of the system 10 thus defines the boundary between a dirty fluid side (e.g., in the example it is the side with ambient air 14A) and a clean fluid side (e.g., with the flowing filtered fluid 14B) and particulate matter is filtered by the filter arrangement.

It is to be appreciated that the filter arrangement 12 is fitted into the aperture 26 such that ambient atmosphere air 14A (e.g., dirty, unfiltered) cannot bypass the filter arrangement. As discussed further below, the filter arrangement 12 has a size/configuration that is to mate with a size/configuration of the aperture 26 to block such bypass and permit flow only through the filter arrangement for filtering there by. It is to be further appreciated that the specifics of the filter arrangement 12 and filter house portion 18, with its aperture 26, need not be as shown within the schematic example of FIG. 1. For example, the filter house portion 18 may include a sheet or barrier in which one or more apertures 26 are provided. One or more respective filter arrangements 12 would be located in the one or more apertures 26 on such a sheet or barrier. Along these lines, the use/presence of plural filter arrangements 12 is certainly contemplated. As such, the filter arrangement 12 and the filter house portion 18 shown within FIG. 1 are to be understood as being very highly schematized and that many details (e.g., size, placement, multiplicity, orientation, etc.) can be varied, and yet the filter arrangement 12 would still be within the scope of the present invention. It is to be appreciated that FIG. 1 is only to show one example system 10 and the flow of fluid associated therewith.

With this understanding, the other portions of the example system 10 can be briefly discussed. The fluid passageway leads to a turbine component 30. The filtered air is thus delivered to the turbine component 30. Within the turbine component 30, the filtered air is combined with a combustible fuel (e.g., natural gas, or the like) to power the turbine. Such operation of the turbine component will be readily appreciated and understood. A load 32, such as an electrical generator, is operatively connected to be driven by the turbine component 30. Again, it is to be understood that these portions of the system 10 are only schematically shown. Also, these portions of the system 10 need not be limitations upon the present invention.

Figure 2:
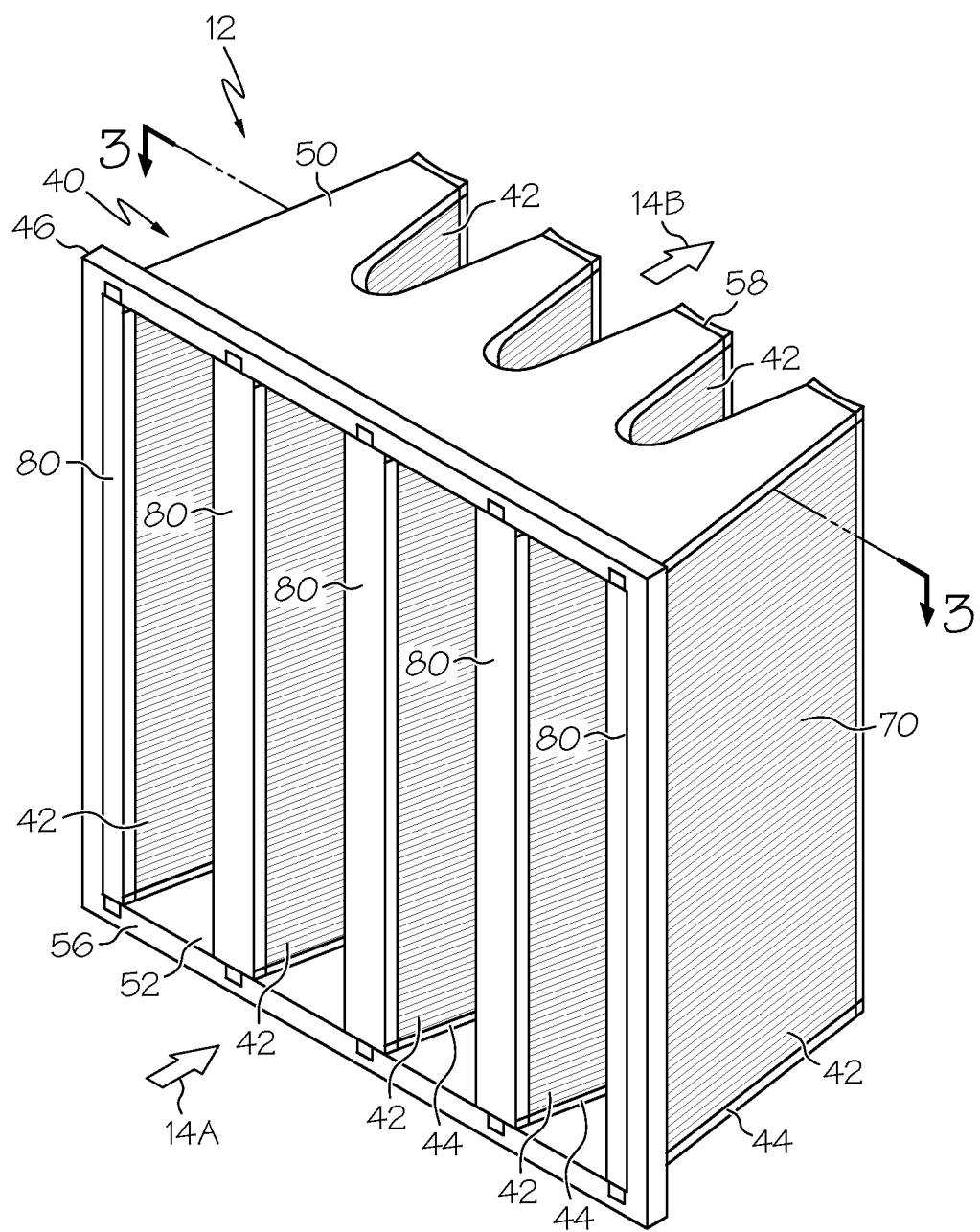
FIG. 2 is a schematized, perspective illustration of one example of the filter arrangement in accordance with an aspect of the present invention.

Turning to FIG. 2, a schematized perspective view of one example filter arrangement 12 in accordance with at least one aspect of the present invention is shown. The filter arrangement 12 includes a frame 40 and a plurality of filter cartridges 42 that are each removably located within a respective filter cartridge seat slot 44 of the frame 40 in accordance with an aspect of the present invention. See FIGS. 3 and 4.

Turning to the frame 40 (FIG. 2), the frame may be made of any generally rigid material such as plastic or metal. It is to be appreciated that the frame 40 has an outer periphery 46 that has a shape and size that is complementary to a shape and size of the aperture 26 to block bypass flow as discussed above. The frame 40 can thus be considered to be configured such that the outer periphery of the frame 40 is to mate against a sheet or barrier as mentioned above. The frame 40 has a top 50 and a bottom 52 that are solid such that fluid does not pass there through. The top 50 and bottom 52 face each other to bound an interior space. Located along the interior surfaces of the top 50 and bottom 52 are a series of the filter cartridge seat slots 44 (FIGS. 3 and 4) that each extend from a front 56 of the frame 40 to a rear 58 of the frame. The series of seat slots 44 are arranged in V-shaped pairs of the seat slots 44. Within the shown example, there are four V-shaped pairs of seat slots 44. Each V-shaped pair can adjoin at least one other V-shaped pair. However, it is to be appreciated that if desired, only a single V-shaped pair of seat slots 44 could be provided. As shown within FIGS. 3 and 4, the seat slots 44 are for location of filter cartridges 42 therein for operation of the filter arrangement 12.

For each seat slot 44, the frame 40 has an opening (e.g., 62, see FIG. 4), or is otherwise open, at the front side 56 and the frame a closed end 64 at the back side 58. Also at location of each seat slot 44, the frame 40 has an aperture 68, referred to herein as a sub-aperture 68, that is open to thus allow fluid movement there through from the front side 56/interior of the filter arrangement toward the back side 58 of the frame 40. With each respective filter cartridge 42 located within a respective seat slot 44, the respective filter cartridge extends across the respective aperture 68. Thus, air flow through the filter cartridge 42 is also flow through the sub-aperture 68.

Figure 3:
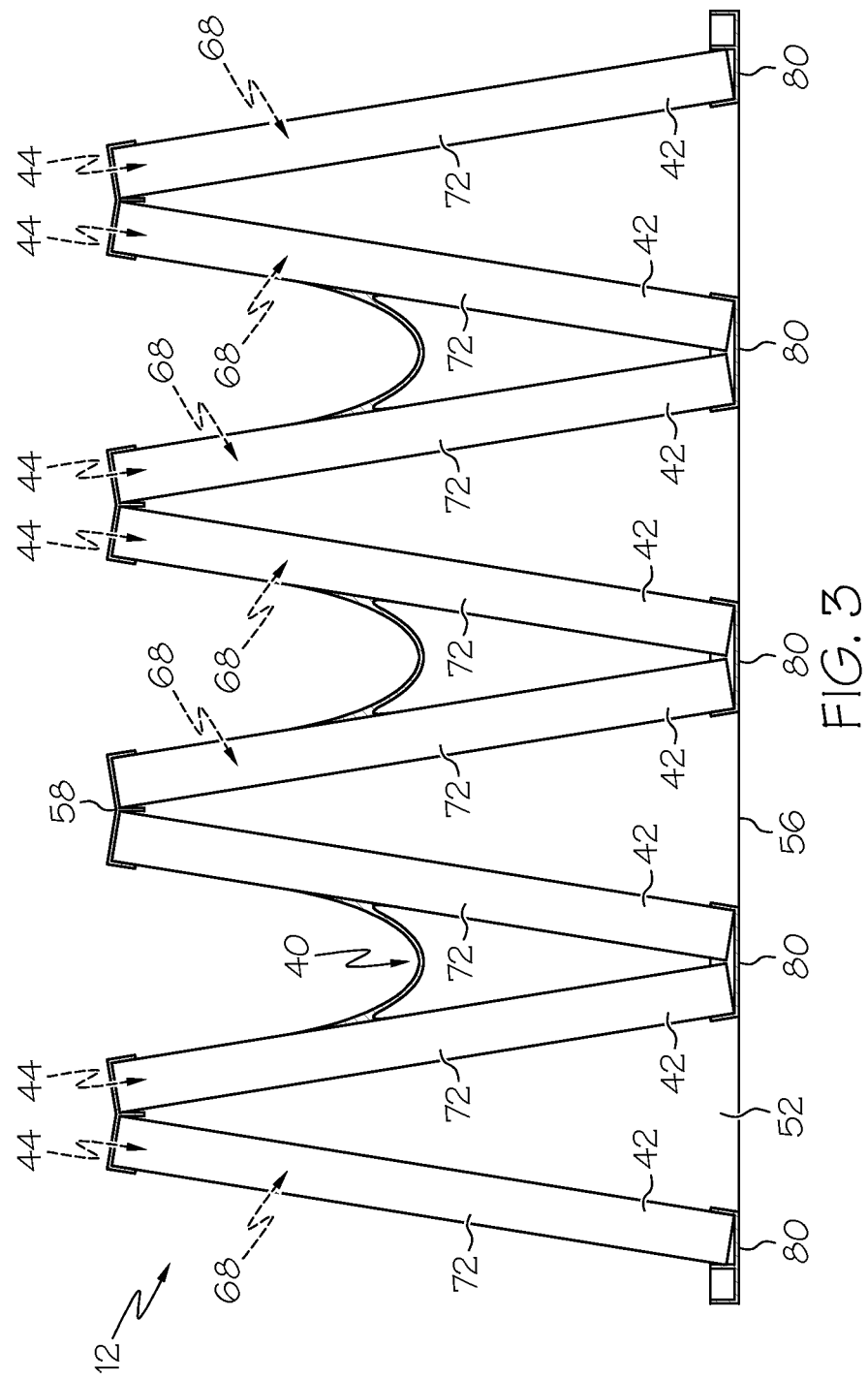
FIG. 3 is a view taken along line 3-3 in FIG. 2.
Figure 4:
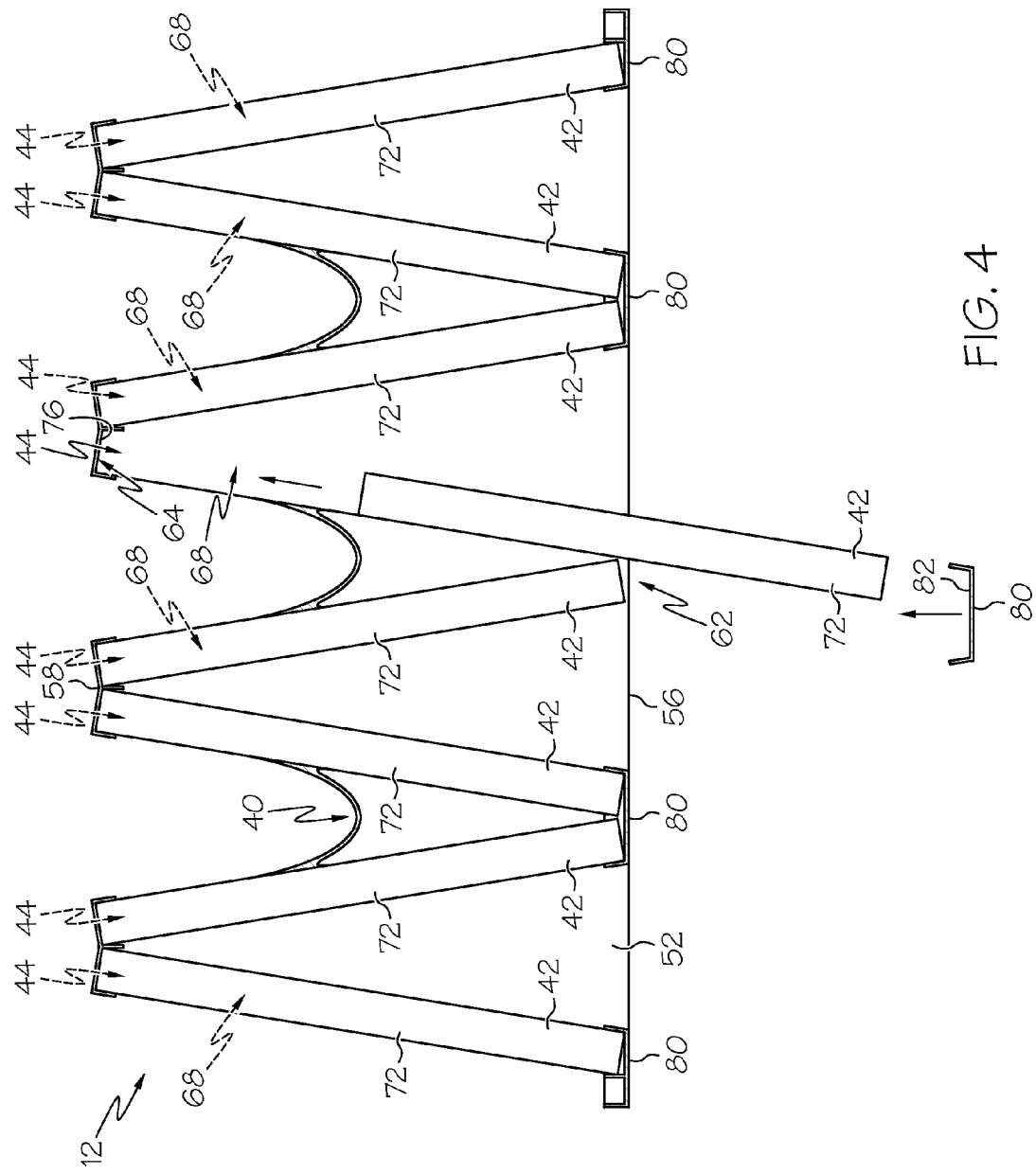
FIG. 4 is a view similar to FIG. 3, but shows one clip disengaged from a frame and one filter cartridge partially removed out from a seated position in the frame in accordance with an aspect of the invention.

Turning to the filter cartridges 42, within the shown example of FIGS. 2-4, the filter cartridges contain a filter media 70 (see FIG. 2) for filtering particulate matter. The filter media 70 may be pleated such that the surface area through which fluid (e.g., air) can flow for filtering extends along each of the plurality of pleats of the filter media 70. It is to be appreciated that the pleats can have any size, configuration, orientation, etc. Also, it is to be appreciated that the filter cartridges need not have a pleated configuration and that other configurations (e.g., mats) are contemplated. It is to be appreciated that the filter media 70 may have any of several known materials such as, fibers (e.g., glass fibers), membrane (e.g., ePTFE), a combination of multiple materials/components, etc. It is to be appreciated that the specific filter media need not be a limitation upon the present invention. In general, the specific filter cartridges, and filter media therein, may be selected/chosen for specific filtration needs (i.e., specific particulate matter to be filtered).

Each of the example filter cartridges 42 may also include a peripherally-surrounding, bounding support member 72 (herein, peripheral member) that extends around a periphery of the filter cartridge. This peripheral member 72 can be constructed of any generally rigid material such as plastic, metal or the like. The pleated filter media 70 is adhered/potted such that the filter media is secured within the peripheral member 72. Thus, each filter cartridge 42 is generally a panel or panel-liken with a face on each of the two sides of the filter media, with one face being a face for the dirty side and the other being a face the clean side as the fluid flows through the filter cartridge. In other words, the example filter cartridges 42 are panel filters.

As mentioned, each of the filter cartridges 42 is removably located into a respective one of the seat slots 44 of the frame 40. As shown in FIG. 4, the movement (e.g., in or out) of each filter cartridge 42 relative to the seat slot 44 is via a sliding movement relative to the frame 40. FIG. 4 specifically shows one filter cartridge 42 being moved (e.g., sliding movement) into the respective seat slot 44 (see movement arrowhead in seat slot). The sliding movement of the filter cartridge 42 into the respective seat slot 44 is generally in a direction transverse to the flow of fluid through the respective filter cartridge once the filter cartridge is fully positioned into the seat slot 44 of the frame 40. It is to be appreciated that at the distal end of each seat slot (i.e., at the back side of frame) a seal member 76 can be provided within the example (note that the only one seal member is indicated within FIG. 4), for the filter cartridge 42 that is partially out from the respective seat slot 44. It is to be appreciated that seal members may be provided for all seat slots 44/filter cartridges 42. It is to be appreciated that the seal members 76 are optional and that the seal members 76, if present, may have the variety of constructions and configurations. In general, the seal members 76 can be resilient such that the sliding movement of each respective filter cartridge 42 fully into the respective seat slot 44 slightly compresses the respective seal member to prevent passage of fluid around the distal end of the filter cartridge. It is to be further appreciated that the mere engagement of the filter cartridges 42 fully into the seat slots 44 at the end 64 may provide sufficient sealing to prevent undesired bypass and thus can provide another example sealing arrangement. Regardless of the specific sealing arrangement to prevent bypass (e.g., tight engagement, separate seal members, etc.), it is to be appreciated that the sealing arrangement is nonpermanent with respect to the filter cartridges so that the filter cartridges 42 can be removed and replaced.

The example filter arrangement 12 also includes a plurality of clips 80 (schematically shown). Each clip 80 can be secured to the frame 40 (see FIG. 2 showing all clips in a secured state) and removable from the frame (see FIG. 4 for one clip removed from the frame and thus unsecured from the frame). The clips 80 extend from the top 50 to the bottom 52 of the frame 40 and extend over the proximal ends of the filter cartridges 42 once the filter cartridges are positioned fully into the respective seat slots 44. The clips 80 can have various constructions and configurations. Due to the adjoining V-shape configuration of the filter cartridges 42, it is to be appreciated some of the clips 80 can extend over the ends of two filter cartridges. It is to be appreciated that at least some of the clips 80 extend over the end of only a single filter cartridge. Specifically, these single filter clips are located at the left and right sides, as viewed within the FIGS. 2-4, of the filter arrangement.

The clips 80 fasten to the front 50 of the frame 40 to secure to the frame and prevent removal of the filter cartridges 42 from the frame. It is only after the clips 80 are removed from the frame 40 may the filter cartridges 42 be removed. As an example, FIG. 4 shows one clip 80 removed from the frame 40 and shows one of the filter cartridges partially removed from the frame. The construction/configuration of the securing aspect of the clips 80 is only schematically shown. It is to be appreciated that the securing aspect may be varied. Some examples of the securing aspect may be provided as latches, bayonets, clasps, resilient members, snaps, etc. The specific securing aspect of the clips need not be specific limitations upon the present invention.

It is to be appreciated that within the shown example, the clips 80 act as barriers at the respective proximal ends of the filter cartridges to prevent fluid flow past the ends of the filter cartridges. Note that FIG. 4 shows a movement arrowhead to indicate the movement of the removed clip 80 back onto the frame 40. With regard to fluid flow by-pass prevention, a seal member 82 can be provided within each clip 80 of the example (note that the only seal member 82 indicated is within FIG. 4, for the clip 80 that is removed from the frame 40). It is to be appreciated that seal members 82 may be provided for all of the clips 80. It is to be appreciated that the seal members 82 are optional and that the seal members, if present, may have the variety of constructions and configurations. In general, each seal member 82 can be resilient such that the connection/securing of the clip 80 to the frame 40 slightly compressive the respective seal member to prevent passage of fluid around the distal end of the filter cartridge. It is to be further appreciated that the mere engagement of the clips 80 to the filter cartridges 42 may provide sufficient sealing to provide another example sealing arrangement to prevent undesired fluid bypass. Regardless of the sealing arrangement to prevent bypass (e.g., tight engagement, separate seal members, etc.), it is to be appreciated that the sealing arrangement is nonpermanent with respect to the filter cartridges 42 so that the filter cartridges can be removed and replaced.

It is to be appreciated that once all of the filter cartridges 42 are fully inserted within respective seat slots 44, and once all of the clips 80 are secured to the frame 40 to retain the filter cartridges within the respective seat slots, the filter arrangement 12 becomes a unit that can be secured, as a unit, within the filter house portion 18. Thus, the filter arrangement 12 in accordance with an aspect of the present invention functions essentially identical to previously known filter arrangements that have V-shaped pairs, with the fixed filter portions (i.e., non-removable relative to the frame 40).

It is to be appreciated that once the filter cartridges 42 have achieved a desired level of useful life (i.e., the filter cartridges 42 have entrapped a sufficient amount of particulate matter and/or the filters have been in place during a desired time period), the filter cartridges that are currently present within the filter arrangement 12 can be removed and replaced with new/fresh/different filter cartridges. Specifically, the clips 80 can be detached/removed from the frame 40 to expose the proximal ends of the filter cartridges 42. Each filter cartridge 42 can be removed from its respective seat slot 44 on the frame 40 via a sliding movement out. Subsequently, new/fresh/different replacement filter cartridges 42 can be placed into each of the seat slots 44 via a sliding movement in from the front side 56. Once all of the filter cartridges 42 associated with a respective clip 80 are in place, the clip can be reattached to the frame 40 (see movement arrowheads in FIG. 4).

As can be appreciated, the removal/replacement of filter cartridges 42 allows reuse of the frame 40 and the clips 80. Only the removed filter cartridges 42 need disposal. Accordingly, the amount of material that needs to be disposed is reduced. Also, it is to be appreciated, that only replacement filter cartridges need to be obtained, shipped, stored, and the like. Since these filter cartridges 42 are general panel like, storage of the uninstalled filter cartridges tends to have a smaller storage volume requirement. Still further, it is possible that cost savings can be achieved since the frame 40 and the associated clips 80 need not be replaced at the same frequency as replacement of the filter cartridges 42. It is possible to consider the frame 40 and the associated clips 80 may effectively never need replacement.

It is to be appreciated that the example shown in FIGS. 2-4 is directed to just one example type of filter cartridge and need not be a specific limitation upon the present invention. It is to be appreciated that aspects of the present invention can be applied within an arrangement that has a different type of filter cartridge. As such, attention is directed to the example shown in FIGS. 5 and 6. A second example of a filter arrangement 12' that includes at least one aspect of the present invention is shown. It is to be appreciated that the filter arrangement 12' can be utilized within the example system of FIG. 1 or any of the other system types as indicated as being contemplated.

Figure 5:
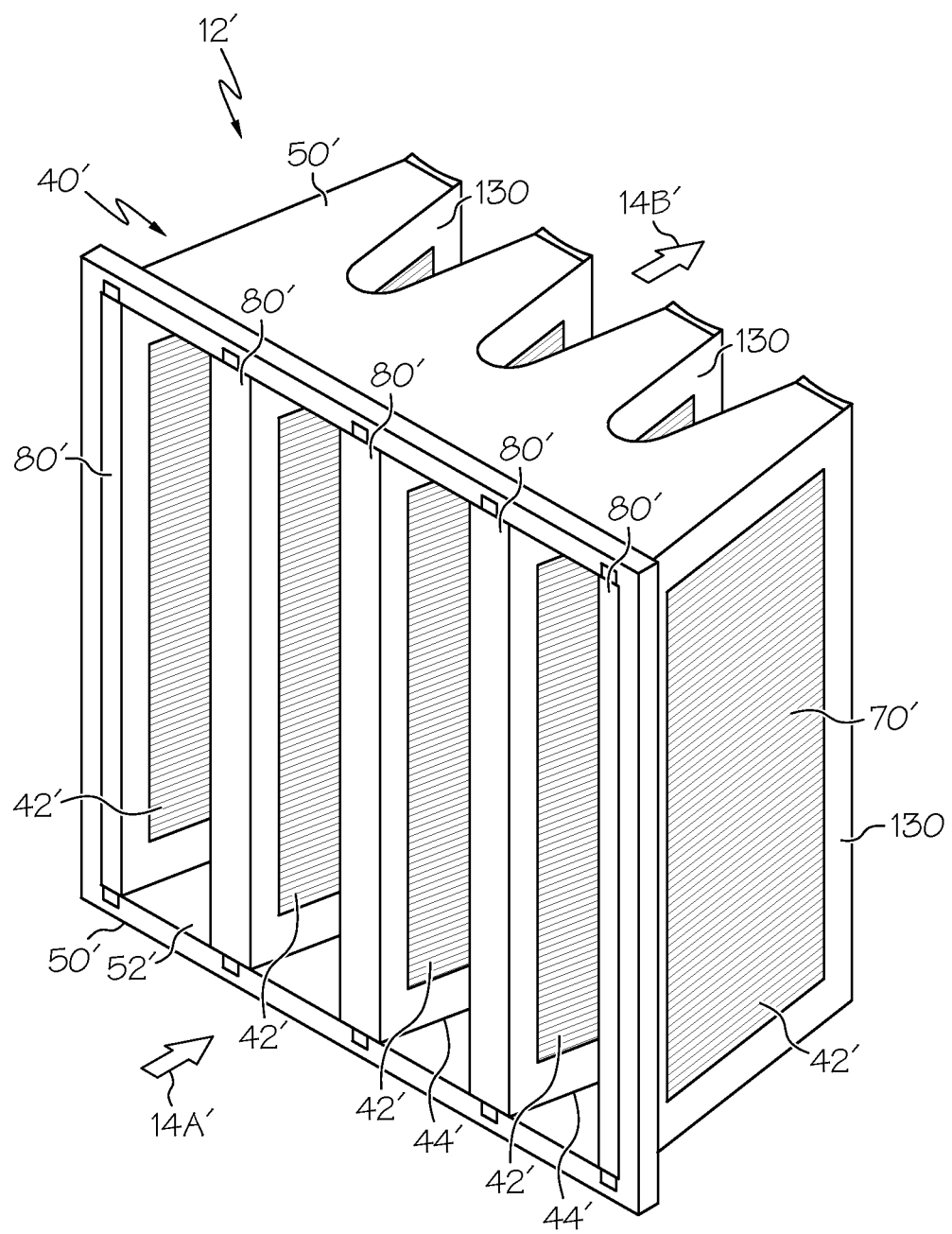
FIG. 5 is a view similar to FIG. 2, but shows a second example filter arrangement in accordance with an aspect of the present invention.

In general, the example filter arrangement 12' shown within FIG. 5 has several similarities to the example filter arrangement 12 shown within FIGS. 2-4. Similar structures are indicated within FIG. 5 via similar numeral that contain a "'" (prime). For example, the filter arrangement 12' shown within FIG. 5 has a plurality of filter cartridges 42' that are held in V-shaped pairs via the frame 40'. However, as shown within the example of FIG. 6, the filter cartridges 42' for the example shown in FIG. 5 have a different construction/configuration. Specifically, the filter media of the filter cartridge 42' is arranged in a pleated fashion, which may be similar to the filter media of the example of FIGS. 2-4. However, the filter cartridge 42' does not include an outer periphery bounding member. Instead, the filter media 70' is held in the pleated configuration via the use of glue that extends in lines 100 transverse to the extent of pleat extensions. As such, there is no periphery potting of the pleats into a periphery bounding member that would block bypass flow of fluid at the outer periphery of the pleated media.

In order to control (i.e., seal-off or block) unwanted bypass flow, a face-on gasket 104 is utilized to prevent undesired bypass flow of fluid past the pleated media and thus allows only flow through the pleated media. Specifically, the gasket 104 has a generally rectangular configuration. The gasket 104 has first and second segments 108 and 110 that extend in a first direction and extend on top of two of the glue lines 100 that retain the pleated filter media 70' in the pleated configuration. The gasket 104 also has third and fourth segments 112 and 114 that extend along at least one respective pleat extension.

Figure 6:
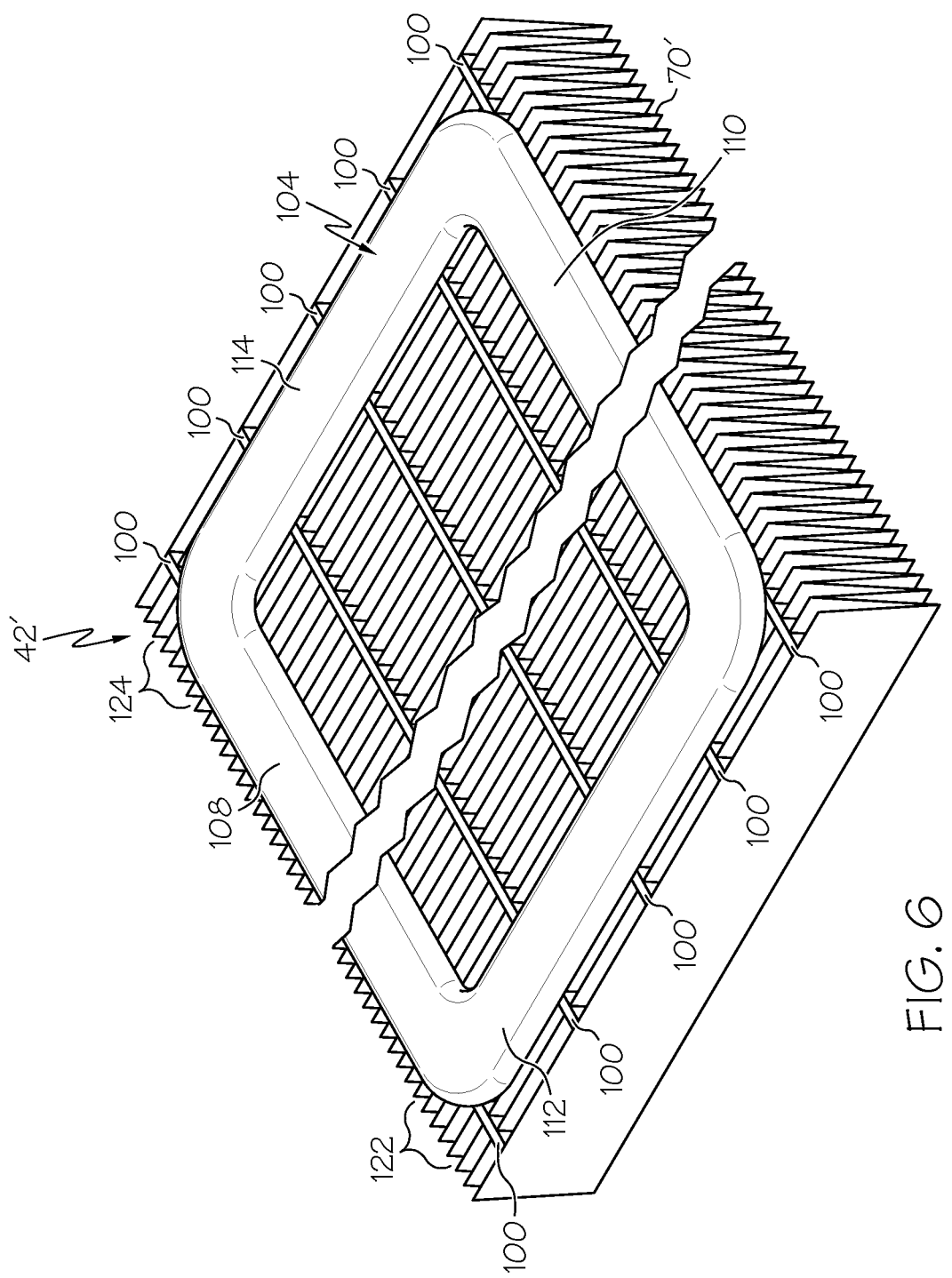
FIG. 6 is a perspective view of an example filter cartridge for use within the example filter arrangement of FIG. 5 in accordance with an aspect of the present invention.

Within the shown example the third and fourth segments 112 and 114 of the gasket 104 extend along a plurality of pleats extensions (see pleat groups 122 and 124). The gasket 104 can be made of resilient material to conform against the filter media 70' and the glue lines 100. It is to be appreciated that the gasket 104 may be adhered to the filter media 70' or simply held in place against the filter media 70' via a compressive force. It is to be appreciated that FIG. 6 should not be used to provide dimensions for the filter cartridge 42'. For example, FIG. 6 shows an example tear line to indicate that such example torn dimensions need not be limitations. It should be appreciated that other dimensions (e.g., the transverse dimensions) can also vary and thus need not be limitations. It should be appreciated that at some of the dimensions of the filter cartridge 42' will be dependent upon dimensions that are present for the frame 12' of the filter arrangement 12'.

Turning to the frame 40' of the filter arrangement 12' of FIG. 5, it is to be appreciated that the frame 40' is constructed/configured slightly different than the example shown with FIG. 2. Within FIG. 5, the frame 40' has panel segments 130 that extend at least partially over the face of each filter cartridge 42' located within the respective seat slots. These panel segments 130 thus extend to engage against the gasket 104 located on the face of the pleated filter media 70'. As such, the respective gaskets 104 are hidden from view in FIG. 5 behind the panel segments 130. However, the gasket 104 thus seals against both the panel segments 130 and the filter media 70'.

Once the filter cartridges 42' (e.g., the pleated filter media 70' and associated gasket 104) are slid into the respective seat slot 44', clips 80' provide a retaining function similar to that described with regard to FIG. 2. It is to be appreciated that seals (e.g., 76 and 82, refer to FIG. 4) need not be placed at the distal and proximal ends of the respective seat slots 44' (FIG. 5) since the gasket 104 provides the sealing function between the face of the pleated filter media 70' and the panel segments 130 on the frame. It is also to be appreciated that the gasket 104 (FIG. 6) may need to be urged into compression as the gasket and the filter media 70' are moved into the respective seat slots 44'. Thus, it is to be appreciated that a biasing arrangement can be utilized to provide/ensure sealing by the gasket 104.

It should be noted that the engagement of each respective filter cartridge 42' is not permanent with respect to the frame 40'. Specifically, each filter cartridge 42' is removable and thus replaceable. The sealing function provided by the gasket 104 is non-permanent since the gasket is not adhered to the panel segments 130. The gasket is only held in place via contact and/or pressure. It is easy to appreciate that the respective gasket 104 can be removed within the respective filter media 70'. It is further an option to reuse the gasket 104 when the filter media 70' is removed and replaced or to use a fresh gasket 104. However, it is to be clear that the frame 40' is reusable and need not be replaced with the same frequency as the filter media 70'. As such, it is possible to consider that the frame 40' effectively need never be replaced.

As can be appreciated, an associated method of providing the filter arrangement 12 for the system 10 within which fluid 14 is filtered is contemplated to be within the scope of the invention. One example is for the method to be associated the system 10 that has the portion with the aperture 26 into which the filter arrangement 12 is located for filtering fluid from a dirty side and to a clean side as the fluid flows through the filter arrangement 12. The method including providing the frame 40 that has an outer periphery 46 that has a shape that is complementary to a shape of the aperture 26 for location of the filter arrangement 12 therein. The frame 40 also has the plurality of filter cartridge seat slots arranged in V-shaped pairs, with each filter cartridge seat slot 44 providing the sub-aperture 68 through the frame 40 for flow proceeding from the dirty side to the clean side. Each filter cartridge seat slot 44 removably receives the respective filter cartridge 42 in a direction transverse to the flow proceeding through the sub-aperture 68. The method includes providing the plurality of filter cartridges 42, with each filter cartridge 42 being removably located within the respective filter cartridge seat slot 44 of the frame 40. Each filter cartridge 42 including filter media 70 that allows flow therethrough from the clean side to the dirty side while stopping flow of particulate matter. The method also includes providing a non-permanent sealing arrangement between the filter cartridges 42 and the frame 40 so that flow does not by-pass the filter media 70. The non-permanent sealing arrangement permits removal of the filter cartridges 42 from the frame 40 and replacement with new filter cartridges upon the frame.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A filter arrangement for a system within which fluid is filtered, the system has a portion with an aperture into which the filter arrangement is located for filtering fluid from a dirty side and to a clean side as the fluid flows through the filter arrangement, the filter arrangement including:
   a frame including:
   an outer periphery that has a shape that is complementary to a shape of the aperture for location of the filter arrangement therein; and
   a plurality of filter cartridge seat slots arranged in V-shaped pairs, each filter cartridge seat slot providing a sub-aperture through the frame for flow proceeding from the dirty side to the clean side, each filter cartridge seat slot for removably receiving a respective filter cartridge in a direction transverse to the flow proceeding through the sub-aperture;
   a plurality of filter cartridges, each filter cartridge being removably located within a respective filter cartridge seat slot of the frame, each filter cartridge including filter media that allows flow therethrough from the clean side to the dirty side while stopping flow of particulate matter;
   a non-permanent sealing arrangement between the filter cartridges and the frame so that flow does not by-pass the filter media, the non-permanent arrangement permitting removal of the filter cartridges from the frame and replacement with new filter cartridge upon the frame;
   wherein the non-permanent sealing arrangement includes seals that are located between the filter media of the filter cartridges and portions of the frame;
   wherein the filter cartridges include filter media in a pleated configuration and glue lines extending to retain the media in the pleated configuration; and
   wherein the seals engage against the pleated configuration of the media.

2. A filter arrangement as set forth in claim 1, wherein the non-permanent sealing arrangement includes clips that removably secure to the frame.

3. A filter arrangement as set forth in claim 2, wherein the clips prevent filter cartridge removal from the filter cartridge seat slots when the clips are secured to the frame.

4. A filter arrangement as set forth in claim 1, wherein the plurality of filter cartridges are disposable after use and the frame is reusable.

5. A filter arrangement as set forth in claim 1, wherein the frame includes closed ends at distal ends of the filter cartridge seat slots.

6. A filter arrangement as set forth in claim 5, wherein the plurality of filter cartridges can be removably engaged to the closed ends at distal ends of the filter cartridge seat slots.

7. A filter arrangement as set forth in claim 1, wherein the filter cartridges are panel filters with two opposed side through which fluid flows during filtering.

8. A filter arrangement as set forth in claim 7, wherein the panel filters are slid into the plurality of filter cartridge seat slots, with the direction of sliding of each panel filter being transverse to the flow proceeding through the panel filter.

9. A filter arrangement for a system within which fluid is filtered, the system has a portion with an aperture into which the filter arrangement is located for filtering fluid from a dirty side and to a clean side as the fluid flows through the filter arrangement, the filter arrangement including:
   a frame including:
   an outer periphery that has a shape that is complementary to a shape of the aperture for location of the filter arrangement therein; and
   a plurality of filter cartridge seat slots arranged in V-shaped pairs, each filter cartridge seat slot providing a sub-aperture through the frame for flow proceeding from the dirty side to the clean side, each filter cartridge seat slot for removably receiving a respective filter cartridge in a direction transverse to the flow proceeding through the sub-aperture;
   a plurality of filter cartridges, each filter cartridge being removably located within a respective filter cartridge seat slot of the frame, each filter cartridge including filter media that allows flow therethrough from the clean side to the dirty side while stopping flow of particulate matter;
   a non-permanent sealing arrangement between the filter cartridges and the frame so that flow does not by-pass the filter media, the non-permanent arrangement permitting removal of the filter cartridges from the frame and replacement with new filter cartridges upon the frame;
   wherein the non-permanent sealing arrangement includes seals that are located between the filter media of the filter cartridges and portions of the frame;
   wherein the filter cartridges include filter media in a pleated configuration and glue lines extending to retain the media in the pleated configuration; and
   wherein the seals engage against the glue lines.

10. A method of providing a filter arrangement for a system within which fluid is filtered the system has a portion with an aperture into which the filter arrangement is located for filtering fluid from a dirty side and to a clean side as the fluid flows through the filter arrangement, the method including:
   providing a frame that has an outer periphery that has a shape that is complementary to a shape of the aperture for location of the filter arrangement therein, and a plurality of filter cartridge seat slots arranged in V-shaped pairs, each filter cartridge seat slot providing a sub-aperture through the frame for flow proceeding from the dirty side to the clean side, each filter cartridge seat slot for removably receiving a respective filter cartridge in a direction transverse to the flow proceeding through the sub-aperture; and
   providing a plurality of filter cartridges, each filter cartridge being removably located within a respective filter cartridge seat slot of the frame, each filter cartridge including filter media that allows flow therethrough from the clean side to the dirty side while stopping flow of particulate matter; and providing a non-permanent sealing arrangement between the filter cartridges and the frame no that flow does not by-pass the filter media, the non-permanent sealing arrangement permitting removal of the filter cartridges from the frame and replacement with new filter cartridges upon the frame;

wherein step of providing the filter cartridges includes providing the filter cartridges filter media in a pleated configuration and with glue lines extending to retain the media in the pleated configuration; and wherein step of providing a non-permanent sealing arrangement includes providing seals that are located between the filter media of the filter cartridges and portions of the frame and the seals engage against the pleated configuration of the media.

11. A method as set forth in claim 10, wherein step of providing the non-permanent sealing arrangement includes providing clips that removably secure to the frame.

12. A method as set forth in claim 11, wherein the step of providing clips includes providing the clips such that the clips prevent filter cartridge removal from the filter cartridge seat slots when the clips are secured to the frame.

13. A method as set forth in claim 10, wherein the step of providing the frame includes providing the frame to be reusable and the step of providing the plurality of filter cartridges includes providing cartridges that are disposable after use and the.

* * * * *